May 19, 1970          S. W. AFFOLTER          3,512,428
ROLLER DETENT ARRANGEMENT FOR POSITIVELY POSITIONING
A RECIPROCABLE ACTUATING MEMBER
Filed Sept. 30, 1968

INVENTOR.
STUART W. AFFOLTER
By Donald S. Ferito
Attorney

United States Patent Office 3,512,428
Patented May 19, 1970

3,512,428
ROLLER DETENT ARRANGEMENT FOR POSITIVELY POSITIONING A RECIPROCABLE ACTUATING MEMBER
Stuart W. Affolter, Canton, Ohio, assignor to United States Steel Corporation, a corporation of Delaware
Filed Sept. 30, 1968, Ser. No. 763,602
Int. Cl. G05g 5/06
U.S. Cl. 74—491                      1 Claim

ABSTRACT OF THE DISCLOSURE

The arrangement of the invention provides mechanical assistance to positively move a longitudinally reciprocable actuating link of a manually operable remote-control linkage system in either direction from a neutral position. The invention includes a housing, which has a spring-loaded piston slidable therein, fixedly mounted adjacent the reciprocable actuating member. Means are provided in the housing to constantly urge the piston toward the actuating link in a path normal thereto. A rotatable bearing is provided on the projecting end of the piston which is adapted to peripherally engage a roller detent rotatably mounted on the actuating link. An upstanding backing plate is fixedly mounted adjacent the actuating link on the side thereof opposite the housing. The backing plate is provided with a vertical notch in which the roller detent is engaged when the actuating link is in neutral position. When the actuating link is moved in either direction from its neutral position, the bearing peripherally engages the roller detent and exerts pressure thereon in the same direction the actuating link is moving.

---

The present invention relates generally to control systems, and more particularly, to a roller detent arrangement especially suitable for use with a manually operable remote-control linkage system which includes at least one longitudinally movable actuating link.

Although not restricted thereto, manually operable remote-control linkages are frequently used to control the direction of the vertical movement of the head compound of a horizontal lathe. In such an arrangement, the lathe operator moves a control lever to one of three positions, neutral, forward and reverse, and this movement is transmitted through pivot points, slotted ball joints, and various shafts or rods to a reciprocable actuating link which is connected by a link element with a clutch-actuating member.

Prior to my invention, the allowable tolerance built into such a linkage system was exceeded as the various elements of the system became worn. This excessive tolerance resulted in the inability of the operator to properly engage or disengage the clutch. The only method of correcting this condition was to replace the worn rods or shafts of the linkage system. Such repair entailed considerable man hours of maintainence repair time and loss of production from the lathe.

In addition, the excessive tolerance caused incomplete meshing of the gears on the clutch assembly which resulted in undue wear and destruction of these parts. It was frequently necessary to replace the clutch members as a result which also required a considerable amount of maintenance labor and down time of the machine.

It is, accordingly, the primary object of my invention to provide a roller detent arrangement which will compensate for excessive free movement tolerance in a remote-control linkage by positively positioning the reciprocable actuating link of the system.

A more specific object of my invention is to provide, in combination with a manually operable remote-control linkage including at least one longitudinal movable actuating link, a roller detent arrangement for positively positioning the actuating link which comprises a housing fixedly mounted adjacent the link, a piston slidably mounted in the housing for movement to and from the actuating link in a plane substantially normal thereto, and spring means in the housing constantly urging the piston toward the actuating link. A bearing is rotatably mounted on the projecting end of the piston to peripherally engage a roller detent which is rotatably mounted on the actuating link. An upstanding backing plate having a vertical notch therein is fixedly mounted adjacent the actuating link on the side thereof opposite the housing and piston. The backing plate, roller detent and the bearing are arranged so that the roller detent is engaged in the notch of the backing plate and the center of the bearing is aligned with the center of the roller detent and the notch when the actuating link is in neutral position.

These and other objects will become more apparent after referring to the following specification and attached drawings, in which.

Figure 1:
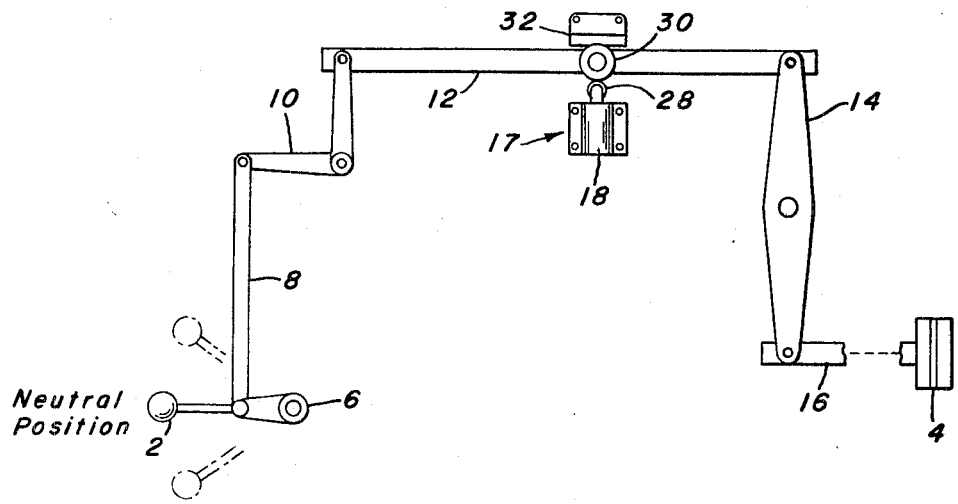
FIG. 1 is a substantially diagrammatic illustration of a manually operable remote-control linkage system having the roller detent arrangement of the invention incorporated therein.
Figure 2:
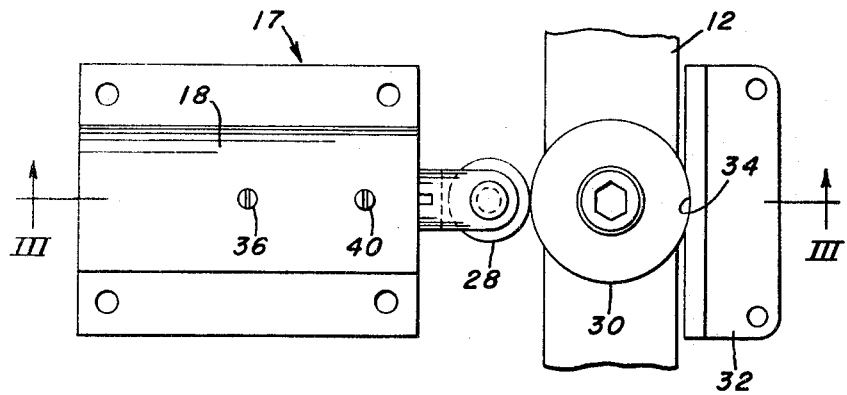
FIG. 2 is an enlarged plan view of the roller detent arrangement of the invention.
Figure 3:
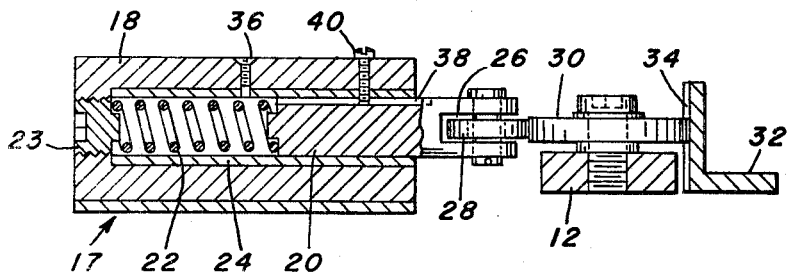
FIG. 3 is a longitudinal sectional view taken substantially along the line III—III of FIG. 2.

Referring more particularly to the drawing, reference numeral 2 designates the control lever of a manually operable remote-control linkage system for engaging and disengaging a clutch 4. The control lever 2 is pivotally mounted at one end 6 and is pivotally connected intermediate its ends to a link 8. A bell crank 10 is pivotally connected by one end to the end of the link 8 remote from the lever 2. The opposite end of the bell crank 10 is pivotally connected with a longitudinally reciprocable actuating link 12 which is, in turn, pivotally connected by its opposite end to one end of a link 14. The link 14 is pivoted intermediate its ends and is pivotally connected at the end thereof opposite the actuating link 12 to a clutch-actuating member 16. The clutch-actuating member is adapted to engage and disengage the clutch 4.

The apparatus thus far described is conventional and is not claimed as my invention, the details of which will now be described.

The roller detent arrangement of the invention, designated generally by reference numeral 17 includes a housing which is fixedly mounted adjacent the actuating link 12 intermediate its ends. A piston 20 is slidably mounted in the housing 18 for movement toward and away from the link 12 in a plane normal thereto. A helical spring 22 is provided in the bottom of the housing with one end bearing against a tension control plug 23, which is adjustably threaded in the bottom of the housing, and its other end bearing against the inner end of the piston 20 to constantly urge the piston out of the housing and toward the actuating link 12. A brass bushing 24 may be provided on the interior of the housing 18 to facilitate the sliding movement of the piston 20. The outward end of the piston 20 is provided with a longitudinal slot 26 in which is mounted a roller bearing 28. The roller bearing 28 is mounted in such a manner that the inner race of the bearing is held fast while the outer race is free to rotate. Roller detent 30 is rotatably mounted on the actuating link 12. An upstanding backing plate 32 having a vertical notch 34 therein is fixedly mounted adjacent the actuating link 12 on the side thereof remote from the housing 18. The elements of the roller detent arrangement of the invention are arranged so that the roller detent 30 is engaged in the slot 34 of the backing plate 32 and the center of the bearing 28 is aligned with the center of the roller detent 30 and the notch 34 when the actuating link 12 is in neutral position.

An oil fitting 36 projecting through the wall of the housing 18 and the bushing 24 may be provided for lubricating the piston and the spring. A keyway 38 is provided extending longitudinally of the piston 20 for receiving the end of a cap screw 40 so as to be locked against rotation.

The positioning of the roller detent arrangement of the invention along the actuating link 12 is not a critical factor, in that it will function property at any point along the link. It is critical however that the bearing 28 and the roller detent 30 be aligned along a common center when the lever 2 is in neutral position. The backing plate 32 should also be aligned, so that the roller detent 30 in center neutral will rest in the notch 34, thus creating a "positive neutral."

In operation, when the control lever 2 is moved out of neutral position, as shown by broken lines in FIG. 1, the motion it transferred through the link 8 and bell crank 10 to the actuating link 12 on which the roller detent 30 is mounted, causing the roller detent to move out of the vertical notch 34 of the backing plate and away from common center alignment with the bearing 28. As this occurs, the bearing 28, powered by the tension of the spring 22, exerts pressure on the roller detent in the same direction as the actuating link 12 is moving. This pressure, and the resulting movement, not only moves the actuating link sufficiently to provide positive engagement of the clutch 4, but provides continuous positive locking contact, until the lever 2 is moved again.

If desired, where there is insufficient tolerance to allow the roller detent 30 to move out of its neutral notch on the backing plate 32, the backing plate may be spring mounted, thus providing necessary tolerance to permit movement of the roller detent out of the neutral notch.

It will be understood that the roller detent arrangement of the invention may be used, not only as a compensating device for worn linkage systems, but may be installed as "preventative maintenance" on a new linkage system as well.

While I have shown but one embodiment of my invention, other adaptations and modifications may be made without departing from the scope of the following claim.

I claim:

1. The combination with a manually operable remote-control linkage including at least one longitudinally movable actuating link, of a roller detent arrangement for positively positioning said link which comprises a housing fixedly mounted adjacent said link, a piston slidably mounted in said housing for movement to and from said link in a plane substantially normal thereto, spring means in said housing bearing against the inner end of said piston to constantly urge the same toward said link, a bearing rotatably mounted on the end of said piston toward said link, a roller detent rotatably mounted on said link and adapted to be peripherally engaged by said bearing, and an upstanding backing plate having a notch therein fixedly mounted adjacent said link on the side thereof opposite said bearing, said roller detent being engaged in said notch and the center of said bearing being aligned with the center of said roller detent and said notch when said link is in neutral position.

References Cited

UNITED STATES PATENTS

| | | | |
|---|---|---|---|
| 2,484,812 | 10/1949 | Beckwith | 74—491 XR |
| 2,522,779 | 9/1950 | Culkosky | 74—491 XR |
| 2,621,523 | 12/1952 | Taylor | 74—100 |

FRED C. MATTERN, JR., Primary Examiner

F. D. SHOEMAKER, Assistant Examiner